United States Patent [19]
Kobelt

[11] 4,270,631
[45] Jun. 2, 1981

[54] MODULAR CALIPER BRAKE ASSEMBLY

[76] Inventor: Jacob Kobelt, 6110 Oak St., Vancouver, B. C., Canada, V6M 2W2

[21] Appl. No.: 11,872

[22] Filed: Feb. 13, 1979

[51] Int. Cl.³ .......................................... F16D 55/224
[52] U.S. Cl. .................................. 188/72.9; 188/71.1; 188/72.6; 188/73.1
[58] Field of Search ....................... 188/59, 72.6, 72.9, 188/71.1, 73.1, 250 B, 234, 73.3

[56] References Cited

U.S. PATENT DOCUMENTS

| | | | |
|---|---|---|---|
| 2,348,078 | 5/1944 | Ledwinka | 188/59 |
| 2,355,121 | 8/1944 | Tack et al. | 188/59 |
| 2,424,922 | 7/1947 | Sadon | 188/73.3 |
| 2,567,157 | 9/1951 | Tack et al. | 188/59 |
| 2,713,400 | 7/1955 | Coskun | 188/59 |
| 3,088,554 | 5/1963 | Desvignes et al. | 188/59 X |
| 3,482,656 | 12/1969 | Shakespear | 188/264 AA X |
| 4,019,608 | 4/1977 | Johnson | 188/59 |
| 4,060,153 | 11/1977 | Kobelt | 188/72.6 |
| 4,108,285 | 8/1978 | Kobelt | 188/72.6 |

*Primary Examiner*—George E. A. Halvosa
*Attorney, Agent, or Firm*—Shlesinger, Arkwright, Garvey & Dinsmore

[57] ABSTRACT

Modular caliper brake having a body formed of a minimum number of separate modular portions or elements which are bolted together to form a basic unit of minimum capacity. To accomodate larger capacity applications, similar or compatible elements can be added, thus simplifying manufacturing and stocking of components for brake assemblies of differing capacities. Brake body has a pair of generally similar outer yoke elements, a spacer element sandwiched between the outer yoke elements and a mounting element cooperating with at least one of the elements mounting the brake. The outer yoke elements have spaced outer yoke arms to journal the caliper arms thereon. Several tie bolts cooperate with the elements to secure the elements together.

9 Claims, 8 Drawing Figures

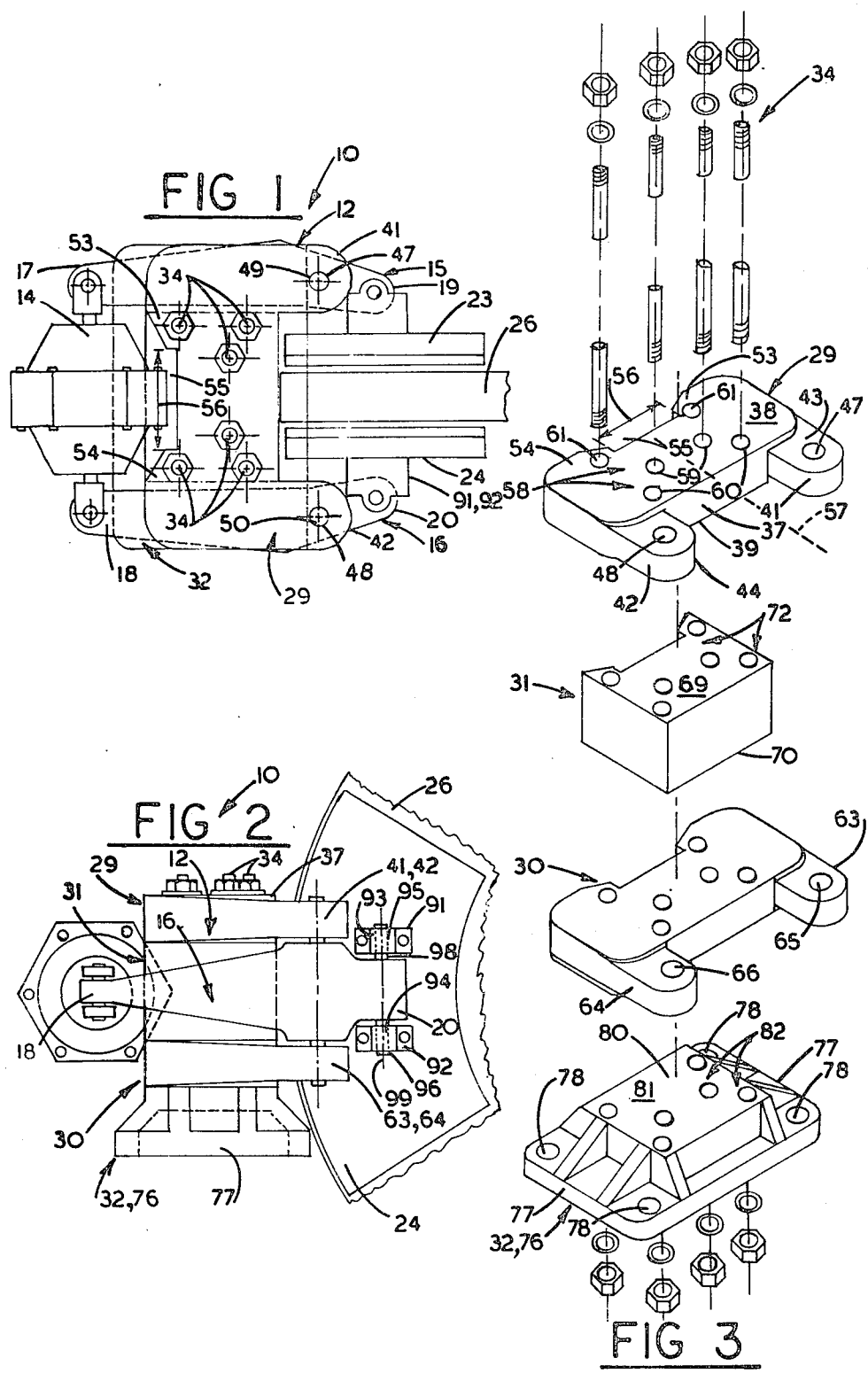

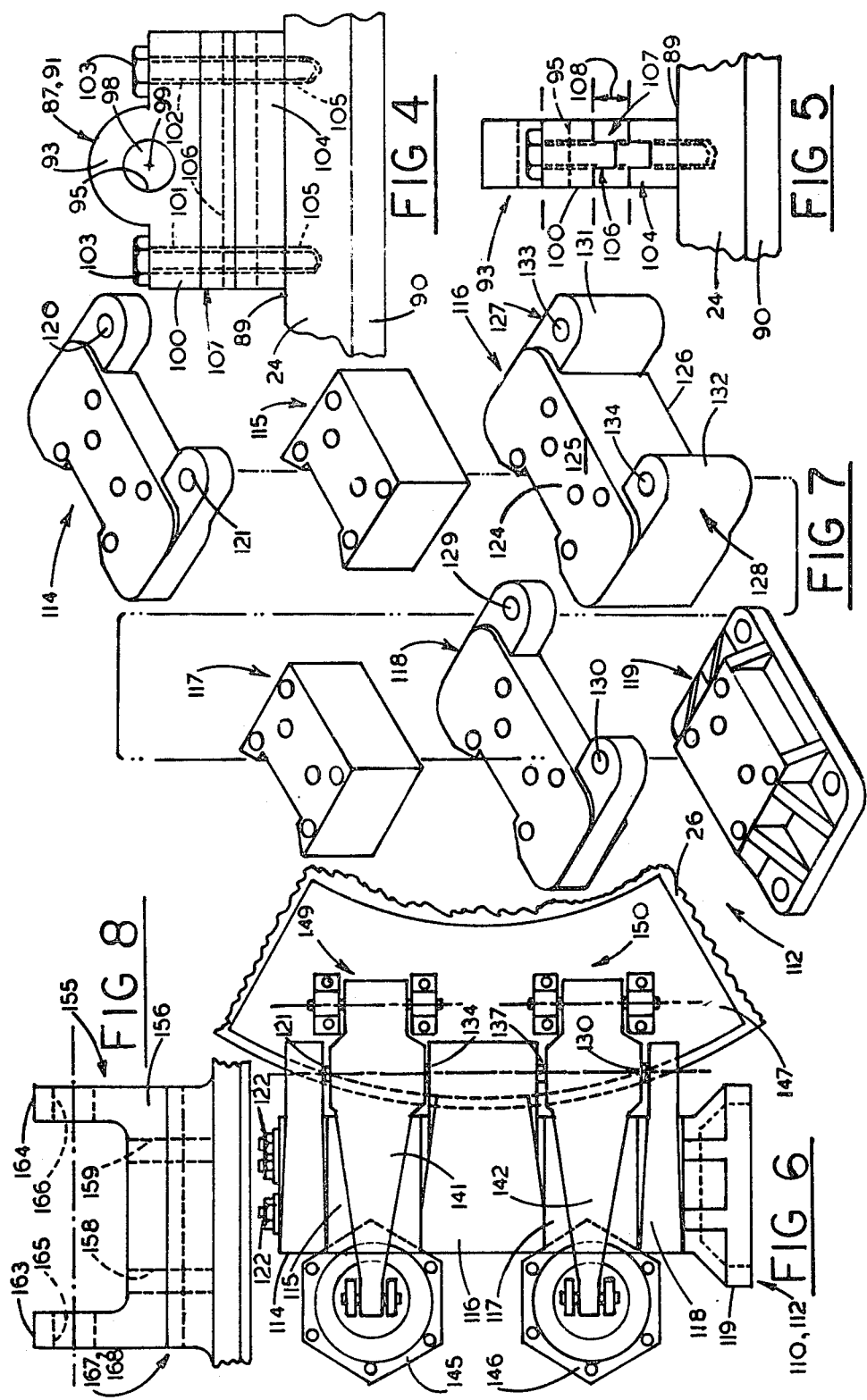

MODULAR CALIPER BRAKE ASSEMBLY

BACKGROUND OF THE INVENTION

1. Field of the Invention

The invention relates to a caliper brake assembly adapted for braking a disc, etc., in particular a brake assembly which can be modified by adding or subtracting structural modules or elements to change braking capacity.

2. Prior Art

Caliper brakes have been used for many years in widely varying applications in many types of equipment and, for an optimum design, a caliper brake assembly is designed specifically to meet particular design requirements. Main design parameter for the caliper brake assembly include horsepower to be absorbed, maximum disc size, brake shoe area, braking force applied normally to disc, etc., plus of course, other factors relating to dimensional or space limitations for installation of the brake assembly on the apparatus. Commonly, when selecting a braking system for a particular item, if an existing caliper brake assembly cannot be used "as is," or simply modified, a new caliper brake assembly is designed. Because the same item to be braked may operate in similar equipment within a wide range of different operating conditions, braking capacity will likely vary considerably. Consequently, for optimum design, even for use in similar equipment, different brake designs would be required. Thus, over the years, manufacturers and equipment suppliers have been obliged to supply many different sizes and types of caliper brake assemblies, and stocking and servicing of these many types of brakes require considerable inventory of parts which is costly for manufacturing, supplying and servicing.

To give one example of the proliferation of brake parts, a brake designed to operate with a disc of a certain thickness cannot easily be adapted to brake a disc of widely different thickness without requiring replacement of caliper arms and/or brake shoes. Thus, even for a relatively simple change, such as the change of disc thickness as above, additional parts would be necessary which of course would require additional stocking of parts.

SUMMARY OF THE INVENTION

The invention reduces some of the difficulties and disadvantages of the prior art by providing a caliper brake having a caliper brake body which can be relatively easily modified to provide different braking capacities by simple addition or subtraction of parts or elements. Furthermore, hinge pin journals on the brake shoes can be easily modified to handle a range of different brake disc thicknesses. Thus, different brake bodies can be assembled from a limited number of modular parts or elements to provide brake assemblies of different capacities, and a set of existing brake shoes can be modified similarly to accommodate brake discs of different thicknesses.

A modular caliper brake body according to the invention is for use in a caliper brake assembly having an actuator and a pair of caliper arms having inner ends cooperating with the actuator and outer ends cooperating with brake shoes. The brake body is characterized by a plurality of discrete separable elements which can be releasably assembled to form the body and disassembled as required. The elements are characterized by a pair of outer yoke elements, a spacer element, a mounting element and the assembled body includes securing means. Each element is essentially a one piece structural element having sufficient thickness to resist bending. The outer yoke elements are generally similar, each yoke element having a body portion with a pair of oppositely disposed faces and a pair of outer yoke arms extending in similar directions from the body portion to respective outer end portions thereof disposed oppositely to each other. Each outer end portion has a width sufficient to provide a relatively large proportion of journalling means for journalling the respective caliper arms thereon. The spacer element has a pair of oppositely disposed faces adapted to cooperate with respective faces of adjacent elements so that relatively large proportions of areas of the respective faces are in intimate contact with each other when the spacer element is sandwiched between the adjacent elements. The mounting element cooperates with at least one adjacent element to permit mounting of the brake body. The mounting element and adjacent element have relatively large proportions of areas of respective faces in intimate contact with each other. The securing means cooperates with the elements when stacked together to hold adjacent faces closely together and to secure the elements together to form an essentially rigid caliper brake body. The brake assembly is further characterized by lug means releasably connected to the brake shoes and having journalling means therein to journal the shoes to the caliper arms.

A detailed disclosure following, related to the drawings, describes a preferred embodiment of the invention which is capable of expression in structure other than that particularly described and illustrated.

DESCRIPTION OF THE DRAWINGS

FIG. 1 is a simplified side elevation of a caliper brake assembly according to the invention, the assembly being shown in its simplest embodiment cooperating with a portion of a brake disc, FIG. 2 is a simplified top plan of the simplest embodiment, FIG. 3 is an exploded perspective of a body only of the brake assembly of FIGS. 1 and 2, FIG. 4 is a fragmented front elevation of a brake shoe lug, FIG. 5 is a fragmented end elevation of the brake shoe lug, FIG. 6 is a simplified top plan of a larger capacity embodiment of the invention cooperating with a portion of a brake disc, FIG. 7 is an exploded perspective of the larger capacity embodiment of the caliper brake body of FIG. 6, FIG. 8 is a fragmented side elevation of an alternative brake shoe lug.

DETAILED DISCLOSURE

FIGS. 1 through 3

A caliper brake assembly 10 according to the invention has a modular caliper brake body 12, an actuator 14 and a pair of caliper arms 15 and 16. The arms 15 and 16 have inner ends 17 and 18 cooperating with the actuator and outer ends 19 and 20 adapted to cooperate with the brake shoes 23 and 24 hinged at outer ends of the arms. A brake disc 26, a portion only of which is shown, passes between the brake shoes and, when the actuator 14 extends, the brake shoes are forced against the brake disc to brake it.

The brake body 12 includes a pair of generally similar outer yoke elements 29 and 30, a spacer element 31 and a mounting element 32. A plurality of tie bolts or rods, severally 34, pass through openings in the elements and, with undesignated nuts and washers serve as securing means cooperating with the elements when stacked together to secure the elements together to form the caliper brake body. The outer yoke elements 29 and 30 are generally similar and thus one yoke element only will be described in detail, mostly with reference to FIG. 3. The element 29 has a body portion 37 with a pair of oppositely disposed faces 38 and 39, the faces being generally flat and parallel to each other with the exception of lightening recesses, stiffening webs, etc., not shown but provided as required. The element 29 also has a pair of outer yoke arms 41 and 42 extending in similar direction from the body portion to outer end portions thereof 43 and 44 respectively. The outer end portions have openings 47 and 48 for journalling hinge pins 49 and 50 which are accepted in undesignated bores of the caliper arms 15 and 16 for journalling the respective caliper arms thereon. It can be seen that the undesignated bores of the caliper arms 15 and 16 have a width sufficient to provide a relatively large proportion of bearing area for the hinge pins and thus the journalling means for journalling the respective caliper arms thereon. The yoke element 29 has a pair of spaced extensions 53 and 54 extending from the body portion in a direction opposite to the yoke arms, the extensions being spaced apart by a spacing 56 to define in part a recess 55 on a side of the body portion remote from the outer yoke arms. The recess is sufficiently wide to accept a portion of the actuator 14 therein to permit installation of the actuator close to the body portion, as best seen in FIG. 1.

As best seen in FIG. 3, the yoke element 29 has an array 58 of parallel openings, the openings being disposed as three pairs spaced equally on opposite sides of a central axis 57 of the yoke element. A first pair of openings 59 are located adjacent a central portion of the yoke element, a second pair 60 are located adjacent the outer yoke arms and a third pair 61 are located adjacent the extensions 53 and 54 respectively, i.e. closely adjacent the recess 55. Whilst the exact locations of the openings are not critical, the array of openings is selected to provide a relatively even distribution of clamping force and to provide generally evenly spaced locations for the tie bolts to resist forces tending to spread the yoke arms upon application of the brake.

The yoke element 30 is generally similar to the element 29 and has similar outer yoke arms 63 and 64 with respective openings 65 and 66 serving as journalling means which, in combination with the openings 47 and 48 support opposite ends of the hinge pins 49 and 50 to journal the caliper arms thereon. The spacer element 31 is generally similar to the body portion 37 only of the yoke element 29, that is the spacer element 31 resembles the body portion 29 with the outer yoke arms 41 and 42 removed. The spacer element 31 thus has a pair of oppositely disposed faces 69 and 70 and an array 72 of openings positioned to be in a similar array to the openings in the yoke elements. Thus when the spacer and yoke elements are stacked together, the arrays come into register so that the openings are aligned with each other to permit the securing shafts to pass through the aligned openings to secure the spacer and yoke elements together.

The mounting element 32 is a mounting bracket 76 having mounting flanges 77 extending therearound with undesignated stiffeners and openings 78 at corners thereof to accept mounting bolts for securing to other equipment, not shown. The mounting bracket 76 has an inner portion 80 which is generally similar to the body portions of the yoke and spacer elements, and has a face 81 adapted to contact an opposed face of an adjacent element, in this case the outer yoke element 30. The portion 80 has an array 82 of openings which are disposed similarly to the arrays of openings 58 and 72 of the yoke and spacer elements so that when the mounting, spacer and yoke elements are stacked together, the openings in the mounting bracket are aligned with the openings in spacer and yoke elements to accept the tie rods to form the caliper brake body. Clearly, if required, the mounting bracket could be disposed at the opposite end of the caliper brake body, or could be disposed in other planes which would be dependent on the particular installation of the brake assembly. In any event, the mounting element cooperates with at least one of the elements to permit mounting of the brake body as required. It can be seen that adjacent faces of the spacer element and yoke element, or the yoke element and mounting element each have relatively large proportions of areas of respective faces in intimate contact with each other. This is important as a relatively large bearing area between adjacent elements is required to reduce bearing pressures that would tend to aggravate surface deterioration between the elements. When composite assemblies are subjected to irregular or reversing cyclic stresses, "fretting" can occur between elements if there is relative movement or slippage between the faces of the elements. To decrease the tendency of slippage between the faces of adjacent elements, it is important that large areas of the faces are brought into contact. It can be seen that when the securing means pass through the openings in the elements and are tightened, adjacent faces are held closely together to form an essentially rigid caliper brake body that resists warping or bending due to operating stresses. It is seen that the elements 29, 30, 31 and 32 are discrete, separable, essentially one-piece structural elements having sufficient width to resist bending.

FIGS. 1, 2, 4 and 5

The brake shoe 24 has lug means 87 extending from an outer face 89 thereof on an opposite side of the shoe from a brake lining 90. The lug means includes a pair of hinge lugs 91 and 92 having respective ears 93 and 94 with aligned openings 95 and 96 therein to accept a hinge pin 98 mounted in an outer end of the respective caliper arm 16, the hinge pin having a hinge axis 99. In FIGS. 4 and 5, the lug 91 includes a base portion 100 having spaced openings 101 and 102 therein to accept bolts 103 which are portions of lug securing means to secure the hinge lug to the brake shoe. The ear 93 extends generally normally from the base portion from a position between the openings and it can be seen that the overall appearance of the lug, which serves as a means for journalling the brake shoe to the caliper arm, is generally similar to prior art arrangements except that the lug means can be removed by unscrewing the bolts 103. Thus the brake shoes each have adjustable hinge pin lug means extending from an outer face thereof for journalling at outer ends of the arm.

The brake shoe 24 has a first location means 104 with spaced openings 105 therein and comprising a member having a surface thereon with a three-dimensional surface profile, the means being positioned on a side of the shoe remote from the brake lining 90. The openings 105 accept the bolts 103 and are thus portions of the lug securing means. Second location means 106 complementary to the first location means 104 comprising a surface having a three-dimensional surface profile is provided on a side of the base portion 100 remote from the ear 93 so that when the location means are engaged, the lug is located relative to the shoe. The location means can be simple tongue and groove means and are best seen in FIG. 5, or vee-sectioned serrations, dowels and openings, etc. or equivalents. A lug spacer 107 is interposed between the hinge lug and the brake shoe, the lug spacer having undesignated inner and outer surfaces complementary to the adjacent first and second location means 104 and 106 respectively. Thus the spacer also has openings to provide clearance for the bolts 103 and has a particular predetermined thickness 108 which effectively controls the location of the ear 93 of the hinge lug. Clearly to accommodate a disc of maximum thickness for a particular lug means, the lug spacer is omitted and the hinge lug is bolted directly to the first location means 104 on the brake shoe. The spacer positions the opening of the ear in a required location relative to the brake shoe, so that, by providing spacers of different thicknesses, the caliper brake can accommodate, within a limited range, brake discs of different thicknesses.

Thus, it can be seen that by fitting spacers of different thicknesses between the lug means and the brake shoe, spacing between the brake lining and hinge pin at the end of the caliper arm is varied to accommodate different thicknesses of brake discs. Also if several location means are spaced across each shoe, different spacing between the ears can be selected to permit fitting of caliper arms of different widths. Thus, the lug means are releasably connected to the brake shoes which permits the manufacturing of one type of brake shoe to which seperate hinge lugs can be secured using a lug spacer of a selected thickness to accommodate a wide range of brake disc thicknesses and brake capacities.

OPERATION

The operation of the brake disc follows that of conventional brake discs in that actuation of the actuator swings the caliper arms simultaneously to apply the brake. It can be seen that the invention differs from the prior art by providing a demountable brake body which can be assembled easily from a relatively few basic or modular elements to provide a range of brake capacities dependent on the thickness and numbers of spacing elements and yoke elements, and other parameters. By selecting thickness of the lug spacer 107 for the ears of the brake shoes, and spacing between the ears, several different brake assemblies covering a wide range of braking capacities using only the four basic body elements can be assembled.

ALTERNATIVES AND EQUIVALENTS

FIGS. 6 and 7

An alternative assembly 110 is adapted for heavier duty applications and uses some of the components common to the assembly 10 of FIGS. 1 through 3, with an additional element as particularized. The assembly 110 has an alternative modular body 112 which has a first outer yoke element 114, a first spacer element 115, an inner yoke element 116, a second spacer element 117, a second outer yoke element 118 and a mounting element 119. A plurality of tie bolts 122 extend through openings in respective body portions of the elements as previously described, to cooperate with the elements when stacked together to secure the elements together to form the caliper brake body. The outer yoke elements 114 and 118 are similar to the elements 29 and 30 of FIGS. 1 through 3, and have outer yoke arms having openings 120 and 121, and 129 and 130 respectively as shown to accept hinge pins journalling caliper arms. The first and second spacer elements 115 and 117 are similar to the element 31 of FIGS. 1 through 3. Thus, each spacer element has an inner face adapted to cooperate with the inner yoke element, and an outer face adapted to cooperate with the outer yoke element. Thus, when the brake body is assembled, the spacer elements sandwich the inner yoke element, and the outer yoke element are fitted adjacent outer faces of the spacer element.

Referring to FIG. 7, the inner yoke element 116 has a body portion 124 with a pair of oppositely disposed faces 125 and 126, and a pair of inner yoke arms 127 and 128 extending in similar directions from the body portion to outer end portions 131 and 132 respectively. The end portions have openings 133 and 134 respectively and, when the elements are all stacked together, the opening 133 is aligned with openings 120 and 129 of the first and second outer yoke elements, and the opening 134 is aligned with the openings 121 and 130 of the first and second outer yoke elements. As seen in FIG. 6, a hinge pin 137 passes through the aligned openings 121, 134 and 130 as shown and journals first and second caliper arms 141 and 142 on one side of the body. A similar hinge pin and caliper arms, not shown, are mounted on an opposite side of the body to form two opposed pairs of caliper arms hinged on common pins.

Similar first and second actuators 145 and 146 cooperate with the opposed pairs of caliper arms and, because of its width the inner yoke element provides a considerable support for the hinge pins adjacent mid portions thereof to resist bending. The assembly also includes a brake shoe 147 having a pair of lug means 149 and 150 which cooperate with the caliper arms 141 and 142 respectively for hinging thereon, and a brake shoe, not shown, similarly cooperates with the opposite caliper arms. Similarly to the brake shoes 23 and 24, the lug means are releasably connected to the brake shoes to permit insertion of lug spacers, not shown, between the mounting lug means and brake shoe to accommodate variations in brake disc thickness.

FIG. 8

An alternative lug means 155 includes a base portion 156 having openings 158 and 159 therein to receive bolts, not shown, for securing the lug means to a brake shoe 161. The means includes a pair of ears 163 and 164 extending generally normally to the base portion from positions straddling the openings 158 and 159. The ears have aligned openings 165 and 166 therein to accept the hinge pin, not shown, journalling the brake shoe to the caliper arm. The base portion 156 has location means 167 which are complementary to location means 168 of the brake shoe and can be tongue and groove structures for mutual engagement as before described. It can be seen that the alternative lug means is not provided with a lug spacer, but these can be fitted if desired and clearly the lug spacer would have inner and outer surfaces complementary to the location means 168 and 167 respectively. The means 155 is simpler to fit as only two bolts are required to mount the journal for each caliper arm. However, spacing between the ears cannot be increased to accept wider arms but spacer washers, not shown, can be fitted to accept narrower arms.

I claim:

1. A modular caliper brake assembly, comprising:
   a pair of generally similar one-piece yoke elements, each said yoke element having a body portion with a pair of oppositely disposed faces and a pair of yoke arms extending in a similar direction from said body portion, each said yoke arm being disposed oppositely to a corresponding yoke arm of the other of said yoke elements;
   a one-piece spacer element having a pair of oppositely disposed faces, each said spacer element face being adapted to cooperate with one of said yoke element faces with said spacer element sandwiched between said pair of yoke elements;
   a one-piece mounting element cooperating with at least one of said yoke elements and said spacer element for mounting to said brake assembly;
   brake body securing means cooperating with said yoke elements, said spacer element and said mounting element for holding said elements together, said elements thereby forming a modular brake body having a plurality of discreet one-piece separable elements;
   a pair of caliper arms having inner ends and outer ends, said yoke arms having journalling means for journalling said caliper arms;
   an actuator cooperating with said inner ends of said caliper arms;
   lug members pivotably connected to said caliper arm outer ends, each said lug member having a surface facing away from its respective caliper arm, said lug member surfaces having three-dimensional surface profiles;
   a pair of brake shoes connected to said lug members and having connection surfaces located on the sides of said shoes remote from the brake linings of said shoes, said connection surfaces having three-dimensional surface profiles complementary to said lug member surface profiles;
   a brake shoe spacer member of a predetermined thickness positioned between each said lug member and its respective brake shoe for adjusting the distance between each said lug member and its respective brake shoe to accommodate a brake disc of a particular thickness, each said brake shoe spacer member having a first surface with a three-dimensional surface profile complementary to its respective lug member surface profile for interengaging said lug member surface and for thereby engaging said brake shoe spacer member and its respective lug member in interlocking relationship, said brake shoe spacer member also having a second surface opposite said first surface with a three-dimensional surface profile complementary to its respective brake shoe connection surface profile for interengaging said brake shoe connection surface and for thereby engaging said brake shoe spacer member and its respective brake shoe in interlocking relationship; and,
   lug securing means for holding together each said lug member and its respective brake shoe and brake shoe spacer member.

2. The modular caliper brake assembly of claim 1 wherein said brake body securing means comprises:
   a plurality of openings disposed in said spacer element and in said yoke elements in similar arrays so that said openings are aligned with each other when said spacer element and said yoke elements are stacked together; and,
   a plurality of securing shafts adapted to pass through said aligned openings of said spacer element and said yoke elements with means for securing said spacer element and said yoke elements on said shafts.

3. The modular caliper brake assembly of claim 2 wherein said mounting element comprises a mounting bracket having a mounting flange and an inner portion having an array of openings therein disposed similarly to said plurality of openings in said spacer element and said yoke elements, so that, when said mounting element is stacked with said spacer element and said yoke elements, said openings in said mounting bracket are aligned with said openings in said spacer element and said yoke elements to accept said securing shafts to form the brake body.

4. The modular caliper brake assembly of claim 1 and including:
   a one-piece inner yoke element and a second one-piece spacer element adapted to be sandwiched together between said first spacer element and one of said pair of yoke elements so that said spacer elements sandwich said inner yoke element and said pair of yoke elements are each located at the outsides of said spacer elements, said inner yoke element having a body portion with a pair of oppositely disposed faces and a pair of inner yoke arms extending in a similar direction from said body portion, each said inner yoke arm being disposed oppositely to corresponding yoke arms of said yoke elements, said second spacer element having an inner face adapted to cooperate with a face of said inner yoke element and an outer face adapted to cooperate with a face of the adjacent one of said pair of yoke elements;
   a second pair of caliper arms having inner ends and outer ends, said inner yoke arms having journalling means for journalling both pairs of said caliper arms; and,
   a second actuator cooperating with said inner ends of said second pair of caliper arms.

5. The modular caliper brake assembly of claim 4 wherein said pair of yoke elements and said inner yoke element each has a recess on a side of said body portion thereof remote from said yoke arms and said inner yoke arms respectively sufficiently wide to accept a portion of said actuators therein to permit installation of said actuators close to said body portions.

6. The modular caliper brake assembly of claim 1 wherein each said yoke element has a recess on a side of said body portion thereof remote from said yoke arms sufficiently wide to accept a portion of said actuator therein to permit installation of said actuator close to said body portion.

7. The modular caliper brake assembly of claim 1 wherein said lug securing means comprises means for releaseably connecting together each said lug member and its respective brake shoe and brake shoe spacer member.

8. The modular caliper brake assembly of claim 1 wherein each said lug member includes an ear having an opening therethrough and each said caliper arm has a hinge pin mounted therein adjacent its outer end, said ear opening being adapted to accept said hinge pin.

9. The modular caliper brake assembly of claim 1 wherein:
   each said lug member includes a base portion having openings therein for receiving said lug securing means and a pair of ears extending generally normally to said base portion from positions straddling said openings, said ears each having an opening therein aligned with one another; and,
   each said caliper arm has a hinge pin mounted therein adjacent its outer end, said aligned openings being adapted to accept said hinge pin.

* * * * *